United States Patent
McElfresh et al.

(10) Patent No.: US 7,183,765 B2
(45) Date of Patent: Feb. 27, 2007

(54) MICRO-POSITION SENSOR USING FARADAY EFFECT

(75) Inventors: Michael McElfresh, Livermore, CA (US); Matthew Lucas, Pittsburgh, PA (US); Joseph P. Silveira, Tracy, CA (US); Scott E. Groves, Brentwood, CA (US)

(73) Assignee: The Regents of the University of California, Oakland, CA (US)

( * ) Notice: Subject to any disclaimer, the term of this patent is extended or adjusted under 35 U.S.C. 154(b) by 59 days.

(21) Appl. No.: 10/879,222

(22) Filed: Jun. 28, 2004

(65) Prior Publication Data

US 2005/0029436 A1 Feb. 10, 2005

Related U.S. Application Data

(60) Provisional application No. 60/483,577, filed on Jun. 26, 2003.

(51) Int. Cl.
*G01R 33/032* (2006.01)
*G01B 7/14* (2006.01)

(52) U.S. Cl. ............... 324/244.1; 324/207.26

(58) Field of Classification Search ............ 324/244.1, 324/207.24–207.26; 359/280–283; 250/227.21, 250/227.17, 225
See application file for complete search history.

(56) References Cited

U.S. PATENT DOCUMENTS

| | | | |
|---|---|---|---|
| 4,529,875 A | 7/1985 | Brogardh et al. | |
| 4,843,232 A | 6/1989 | Emo et al. | |
| 5,149,962 A | 9/1992 | Maurice et al. | |

(Continued)

FOREIGN PATENT DOCUMENTS

EP 0 430 060 B1 6/1991

(Continued)

OTHER PUBLICATIONS

Charles M. Davis, Fiber optic sensors: an overview, Optical Engineering; vol. 24(2), pp.347-351 Mar./Apr. 1985).

(Continued)

*Primary Examiner*—Reena Aurora
*Assistant Examiner*—Kenneth J. Whittington
(74) *Attorney, Agent, or Firm*—James S. Tak

(57) ABSTRACT

A micro-position sensor and sensing system using the Faraday Effect. The sensor uses a permanent magnet to provide a magnetic field, and a magneto-optic material positioned in the magnetic field for rotating the plane of polarization of polarized light transmitted through the magneto-optic material. The magnet is independently movable relative to the magneto-optic material so as to rotate the plane of polarization of the polarized light as a function of the relative position of the magnet. In this manner, the position of the magnet relative to the magneto-optic material may be determined from the rotated polarized light. The sensing system also includes a light source, such as a laser or LED, for producing polarized light, and an optical fiber which is connected to the light source and to the magneto-optic material at a sensing end of the optical fiber. Processing electronics, such as a polarimeter, are also provided for determining the Faraday rotation of the plane of polarization of the back-reflected polarized light to determine the position of the magnet relative to the sensing end of the optical fiber.

20 Claims, 3 Drawing Sheets

U.S. PATENT DOCUMENTS

| | | | |
|---|---|---|---|
| 5,243,293 A | | 9/1993 | Isozaki et al. |
| 5,434,934 A | * | 7/1995 | Togawa et al. ............... 385/6 |
| 5,719,497 A | * | 2/1998 | Veeser et al. ............... 324/174 |
| 6,611,140 B1 | * | 8/2003 | Bloechl et al. ......... 324/207.21 |
| 6,717,713 B2 | * | 4/2004 | Onaka et al. ............... 359/281 |
| 6,935,566 B1 | * | 8/2005 | Mulla et al. ............ 235/472.01 |
| 2002/0079024 A1 | * | 6/2002 | Araki et al. ............... 148/302 |
| 2002/0125324 A1 | * | 9/2002 | Yavid et al. ............ 235/462.45 |
| 2002/0176679 A1 | * | 11/2002 | Nashimoto ............... 385/132 |

FOREIGN PATENT DOCUMENTS

EP    0 587 708 B1    9/2001

OTHER PUBLICATIONS

Masud Mansuripur, The Faraday Effect, Optics and Photonics News, Nov. 1999 10 pages.

K. Shinagawa, Faraday and Kerr Effects in Ferromagnets; pp. 138-173.

* cited by examiner

MICRO-POSITION SENSOR USING FARADAY EFFECT

I. CLAIM OF PRIORITY IN PROVISIONAL APPLICATION

This application claims the benefit of U.S. provisional application No. 60/483,577 filed Jun. 26, 2003.

The United States Government has rights in this invention pursuant to Contract No. W-7405-ENG48 between the United States Department of Energy and the University of California for the operation of Lawrence Livermore National Laboratory.

II. FIELD OF THE INVENTION

The present invention relates to position sensors, and more particularly to a micro-position sensor using the Faraday Effect and arising from the relative movement between a magnetic source and a magneto-optic material.

III. BACKGROUND OF THE INVENTION

There is a need to sense position and position changes at the micrometer level with a micro sensor for various applications. The position sensor must meet the requirements of an often restricted amount of space, and be conceptually simple and adaptable to ensure ease of use and maximum flexibility for a wide range of applications. Moreover, there is a need to provide a micro-position/micro-displacement sensor with no electrical current at the sensing area, which can require relatively large and often complicated electrical components.

IV. SUMMARY OF THE INVENTION

One aspect of the present invention includes a micro-position sensing system comprising: light source means for producing polarized light; an optical fiber connected to said light source means and extending to a sensing end; a magneto-optic material coupled to the sensing end of the optical fiber and capable of rotating the plane of polarization of polarized light passing therethrough when subject to a magnetic field, the magneto-optic material having a reflective surface configured to back-reflect incident polarized light back through the magneto-optic material and the optical fiber; a permanent magnet positioned adjacent the magneto-optic material for providing a magnetic field thereto, said magnet being independently movable relative to the magneto-optic material so as to rotate the plane of polarization of polarized light passing therethrough as a function of the relative position of the magnet; and means for determining the Faraday rotation of the plane of polarization of the back-reflected polarized light to determine the position of the magnet relative to the sensing end of the optical fiber.

Another aspect of the present invention induces a micro-position sensor comprising: a permanent magnet providing a magnetic field; and a magneto-optic material positioned in the magnetic field and capable of rotating the plane of polarization of polarized light transmitted through the magneto-optic material, said magnet being independently movable relative to the magneto-optic material so as to rotate the plane of polarization of the polarized light as a function of the relative position of the magnet, whereby the position of the magnet relative to the magneto-optic material may be determined from the rotated polarized light.

V. BRIEF DESCRIPTION OF THE DRAWINGS

The accompanying drawings, which are incorporated into and form a part of the disclosure, are as follows.

VI. DETAILED DESCRIPTION

The present invention is generally directed to a micro-position sensor and sensing system utilizing the Faraday Effect, and having an optical input/output device providing the electronics necessary to control the output electromagnetic radiation (referred to herein as "light") and sense the input light (back-reflected) and to perform all necessary calculations. The sensing system preferably uses a single fiber optic. And no electronic elements are utilized at the sensing end of the fiber, which allows the device to be used as a sensor in small areas. Moreover, it operates by measuring simple displacement which enables it to be coupled to mechanical parts to measure physical properties such as, but not limited to, pressure, acceleration, temperature, force, acceleration etc. The fiber responds to the magnetic field of a nearby magnetic field that may be produced in a number of ways. Various uses of the present invention may include, but is not limited to: micro linear position sensor; micro angular position sensor; ultra sensitive pressure gauge, micro vibration sensor; micro accelerometer, force gauge, magnetic media read head; noninvasive internal measuring device; micro flow sensor, and micro magnetic measuring device.

Figure 1:
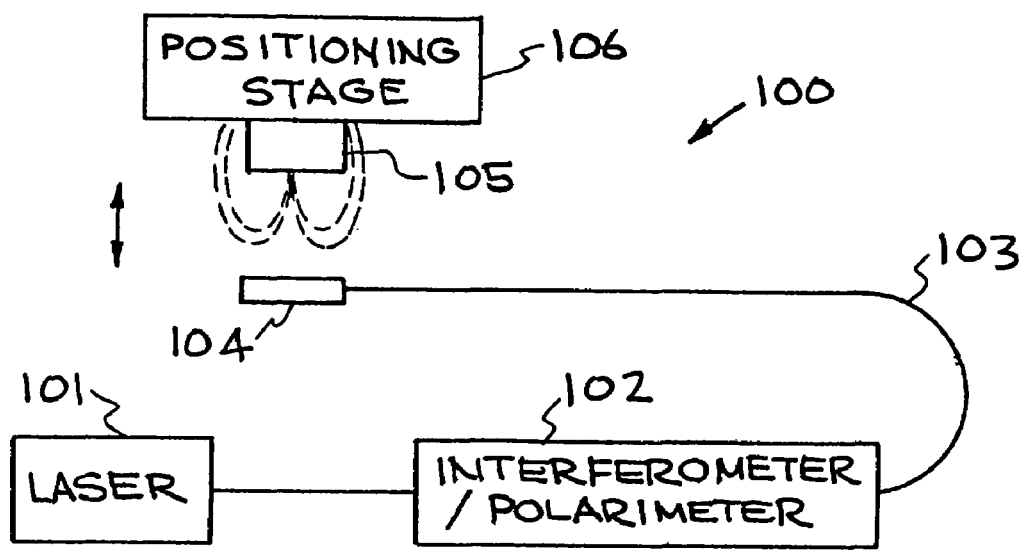
FIG. 1 is a schematic view of an exemplary embodiment of the micro-position sensing system of the present invention.

Turning to the drawings, FIG. 1 shows a schematic view of an exemplary embodiment of the micro-position sensing system 100 of the present invention. A light source 101, such as a laser or LED, is shown connected to an optical fiber 103, along with an electronics processing device 102, based on for example an interferometer. As shown in FIG. 1, box 102 is indicated as an interferometer/polarimeter, which polarizes light from the light source 101 prior to transmission through the optical fiber. And the optical fiber 103 is preferably a polarization preserving fiber. Moreover, the optical fiber 103 may alternatively be made from a magneto optic material, such as Nd doped silica glass, but is not limited only to such. For materials such as Nd doped fibers, the Nd ions act paramagnetic to produce the magneto optic effect. Preferably, the magneto-optic materials of the present invention are soft ferromagnet having zero magnetization with no Faraday Effect by the material alone. In any case, the light source 101 produces an output of light (which may be single or multi-wavelength) and sends it down the optical fiber 103 as polarized light. The magneto-optic sensor uses fiber optics to connect to signal processing electronics including the electromagnetic radiation source (i.e. light source). This enables the sensor to be remotely located from the electronics to reduce the effects of noise/temperature and other environmental effects.

Figure 2:
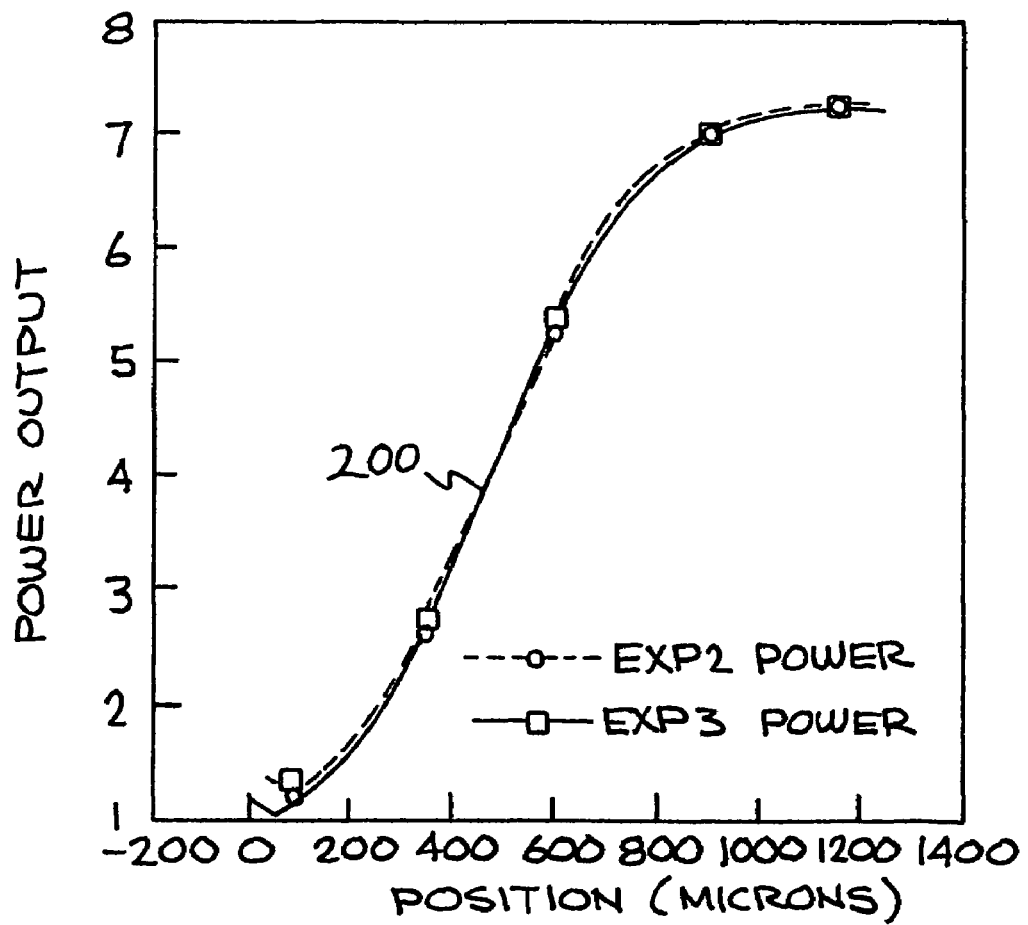
FIG. 2 is graph of the calibrated power output for various positions of the magnet.

The polarized light is transmitted to a sensing end 104 of the optical fiber which is coupled to a magneto-optic material, such as for example bismuth iron garnet, or other soft ferromagnetic material. The light travels down to the sensing end 104 where in the presence of the magnetic field provided by a permanent magnet 105 or other magnetic field producing apparatus, will have its polarization rotated by what is known as the Faraday Effect. The magnet 105 is shown connected to a positioning stage 106 which controls the movement of the magnet. As shown if FIG. 1, the magnet is independently movable relative to the sensing end 104, including the magneto-optic material (see 402 in FIG. 4). In this manner, moving the magnet effectively repositions the magneto-optic material in the magnetic field, without changing the field itself. The light then reflects back down the fiber after hitting the polished or otherwise reflective coating applied to the magneto-optic material. The reflective coating creates a reflective surface for back-reflecting light transmitted through the magneto-optic material and into the fiber optic. The reflected light also undergoes the effects of the magnetic field and so the overall effect is doubled. The reflected light is then taken into the electronic processing unit of the system, represented by 102, to directly measure the properties of the back-reflected light by means of, but not limited to, an optical isolator. The device may also output the ratio of the incident and reflected beam. By calibrating the device it is simple to calculate, to very good accuracy, the position of the magnetic source relative to the end of the fiber. A calibrated graph is shown in FIG. 2 showing the calibration between power output and position in microns. And the present invention is preferably configured to operate in the linear range 200 as shown in FIG. 2.

Generally, the Faraday Effect is a phenomenon of light propagation. When light passes through a Faraday Effect material, the radiation plane of polarization is rotated when a magnetic field is aligned with the direction of propagation of the light. The rotation angle, or more precisely the degree of rotation, is a function of the magnetic field in the region of the material, the material or Verdet constant, and the length of the material through which the light travels. Different materials exhibit the Faraday Effect to a greater or lesser degree than other materials. As used herein and in the claims, the term "magneto-optic material" (MO) is a generic reference to any material that adequately exhibits the Faraday Effect for use in a magneto-optic sensor. MO materials best suited for sensor applications wherein there is a need to detect slight or gradual variations in a magnetic field are rare eart garnet films, such as grown by liquid phase epitaxy (LPE), which have been doped with elements that increase Faraday rotation and decrease optical absorption in the infrared region of the radiation frequency spectrum. These materials have very high Faraday rotation characteristics and a transmission window in the wavelength region of approximately 800 nm. However, other materials may also be suitable, such as yttrium iron garnet and various Faraday glasses.

Certain other factors are important in choosing a MO material for use in a magneto-optic sensor. The magnetic field needed to produce a modulated polarization angle of light should be large enough so that small displacements/movements of the magnetic source produce a detectable change in the magneto-optic output signal. That is a small change in magnetic field characteristics should produce a detectable change in the polarization angle of the light passing through the MO material. The angle through which polarized light is rotated when it passes through the transducer should vary monotonically with respect to the applied magnetic field. Also, the material properties should be stable over a wide operating temperature range. A MO material whose compensation temperature is less than the sensor's minimum operating temperature is less than the sensor's minimum operating temperature range and whose Curie temperature is greater than the sensor's maximum operating temperature must be used.

Figure 3:
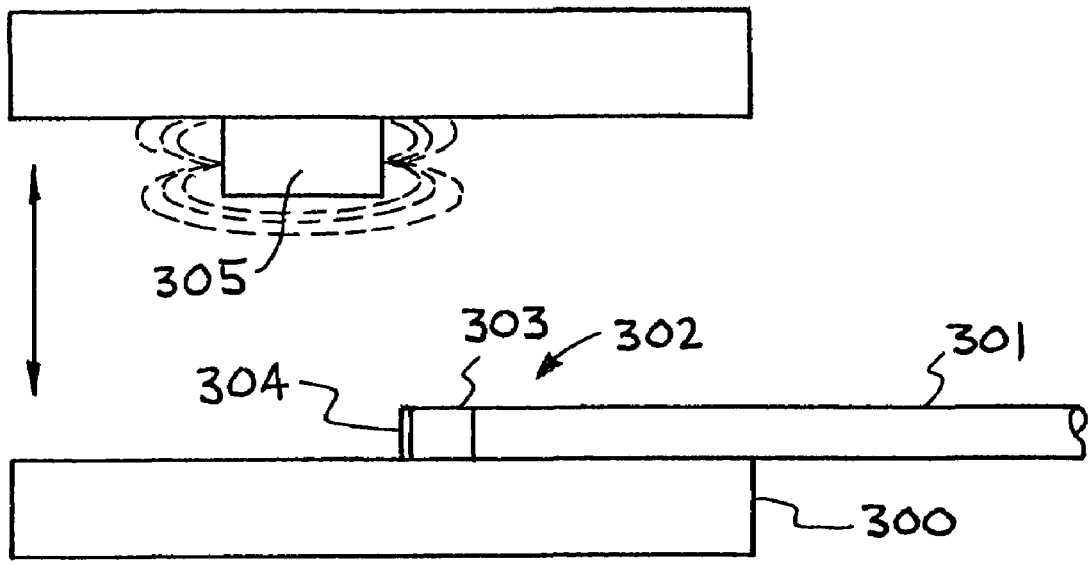
FIG. 3 is a side view of the arrangement between the magnet and the sensing end of the optical fiber, including a magneto-optic material.

FIG. 3 shows a view of the arrangement between a magnet 305 and the sensing end 302 of the optical fiber 301. As shown the sensing end 302 may be securably mounted on a base platform 300 to ensure alignment with the movable magnet. The magnet 305 is shown suspended substantially over the sensing end 302 and the magneto optic material 303 via a support platform, and is configured for vertical displacement, as indicated by the arrows. This arrangement shown in FIG. 3 is configured to enable downward displacement of the magnet 305 to a minimum level which aligns with the optical fiber, at the tip 304 of the sensing end 302 of the optical fiber.

Figure 4:
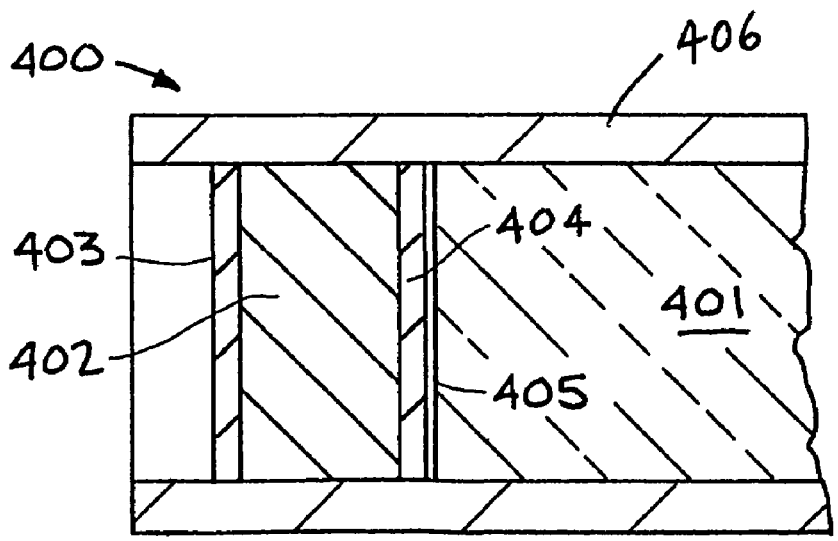
FIG. 4 is an enlarged view of the sensing end of an optical fiber coupled to a magneto-optic material.

FIG. 4 shows an enlarged view of the sensing end 400 of the optical fiber 401, which is coupled to a magneto-optic material 402 by means of a suitable bond, such as an index matching epoxy bond 405. An anti-reflection coating 404 may also be applied to ensure transmission of light through the magneto-optic material. At an opposite end, a highly reflective coating or surface 403 is provided to back-reflect light transmitted through the magneto-optic material. Furthermore, the magneto-optic material and the sensing end of the optical fiber are preferably coaxially aligned using an alignment sleeve 406 to ensure proper coupling thererbetween.

Figure 5:
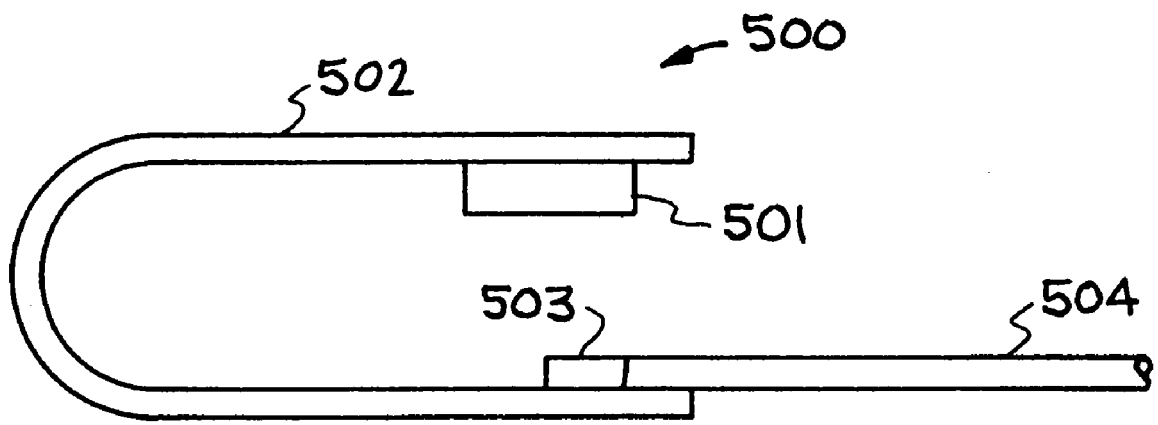
FIG. 5 is a first exemplary embodiment of a suspension structure utilized with the present invention, for displacement measurements.
Figure 6:
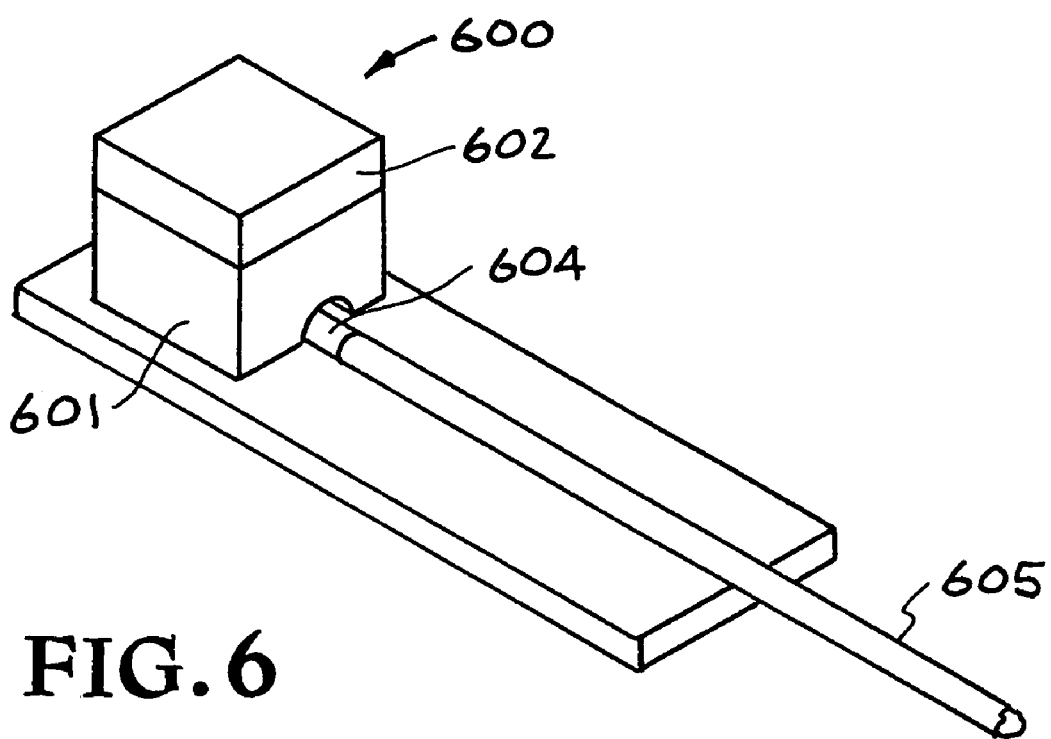
FIG. 6 is a second exemplary embodiment of a suspension structure utilized with the present invention, for force/acceleration measurements.

And FIGS. 5 and 6 illustrate two exemplary embodiments of a connection structure 500 and 600 respectivelywhich is used to movably connect the magnet to the sensing end/magneto-optic material. Preferably the connector structure is resiliently-biasing, i.e. flexible and returns to its original shape when a biasing force is removed. FIG. 5 shows the connector structure having a cantilever configuration with the magnet 501 connected to the underside of one of the arms 502. The sensing end 503 of the fiber optic 504 is located below the magnet 501. This particular configuration is shown for use in sensing micro-displacements. And in FIG. 6, force/acceleration is sensed using a suspension block 601 with design-dependent stiffness chose to achieve a selected range. The magnet 602 is shown placed on top of the suspension block 601 with the sensing end 604 of the optical fiber 605 underneath.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

We claim:
1. A micro-position sensing system comprising:
light source means for producing polarized light;
an optical fiber connected to said light source means and extending to a sensing end;
a magneto-optic material coupled to the sensing end of the optical fiber and capable of rotating the plane of polarization of polarized light passing therethrough when subject to a magnetic field, the magneto-optic material having a reflective surface configured to back-reflect incident polarized light back through the magneto-optic material and the optical fiber;
a permanent magnet positioned adjacent the magneto-optic material for providing a magnetic field thereto, said magnet being independently movable relative to the magneto-optic material in a radial direction to the longitudinal axis of the optical fiber at the sensing end so as to rotate the plane of polarization of polarized light passing through the magneto-optic material as a function of the relative position of the magnet, and said magnet having a range of motion which keeps the magneto-optic material within the range of the magnetic field to maintain continuity of response; and means for determining the position of the magnet relative to the sensing end of the optical fiber by determining the change in Faraday rotation of the plane of polarization of the back reflected polarized light from a calibrated reference position.

2. The micro-position sensing system of claim 1, wherein the optical fiber is made from a magneto-optic material.

3. The micro-position sensing system of claim 2, wherein the optical fiber is made from Nd doped silica glass.

4. The micro-position sensing system of claim 1, wherein the magneto-optic material is coupled to the sensing end of the optical fiber with an index matching epoxy bond.

5. The micro-position sensing system of claim 1, wherein the magneto-optic material is coaxially aligned with the sensing end of the optical fiber with an alignment sleeve telescopically surrounding the magneto-optic material and the sensing end.

6. The micro-position sensing system of claim 1, wherein the independent movement of the magnet relative to the magneto-optic material is a function of a physical property being monitored whereby the monitored physical property may also be determined from the rotated polarized optical signal.

7. The micro-position sensing system of claim 1, wherein the permanent magnet has a thin-film construction.

8. The micro-position sensing system of claim 1, wherein the permanent magnet and the magneto-optic material are connected by a suspension connector which suspends one of the magnet and magneto-optic material substantially over the other.

9. The micro-position sensing system of claim 8, wherein the suspension connector is a resiliently-biasing suspension connector.

10. The micro-position sensing system of claim 9, wherein the resiliently-biasing connector includes a cantilever beam.

11. A micro-position sensor comprising:
a permanent magnet providing a magnetic field; and
a magneto-optic material positioned in the magnetic field and capable of rotating the plane of polarization of polarized light transmitted through the magneto-optic material,
said magnet being independently movable relative to the magneto-optic material in a radial direction to an optical path of the polarized light so as to rotate the plane of polarization of the polarized light as a function of the relative position of the magnet, an said magnet having a range of motion which keeps the magneto-optic material within range of the magnetic field to maintain continuity of response, whereby the position of the magnet relative to the magneto-optic material may be determined from the rotated polarized light.

12. The micro-position sensor of claim 11, wherein the permanent magnet and the magneto-optic material are connected by a suspension connector which suspends one of the magnet and magneto-optic material substantially over the other.

13. The micro-position sensor of claim 11, wherein the independent movement of the magnet relative to the magneto-optic material is a function of a physical property being monitored whereby the monitored physical property may also be determined from the rotated polarized optical signal.

14. The micro-position sensor of claim 11, wherein the magneto-optic material has a reflective coating for back-reflecting polarized light back through the magneto-optic material.

15. The micro-position sensor of claim 11, wherein the magneto-optic material is coupled to a fiber optic for receiving the polarized optical signal therefrom and back-reflecting thereto.

16. The micro-position sensor of claim 11, wherein the permanent magnet has a thin-film construction.

17. The micro-position sensor of claim 12, wherein the suspension connector is a resiliently-biasing suspension connector.

18. The micro-position sensor of claim 17, wherein the resiliently-biasing connector includes a cantilever beam.

19. A micro-position sensing system comprising:
light source means for producing polarized light;
an optical fiber connected to said light source means and extending to a sensing end;
a magneto-optic material coupled to the sensing end of the optical fiber and capable of rotating the plane of polarization of polarized light passing therethrough when subject to a magnetic field, the magneto-optic material having a reflective surface configured to back-reflect incident polarized light back through the magneto-optic material and the optical fiber;
a permanent magnet positioned adjacent the magneto-optic material for providing a magnetic field thereto, said magnet being independently movable relative to the magneto-optic material so as to rotate the plane of polarization of polarized light passing therethrough as a function of the relative position of the magnet, wherein the permanent magnet and the magneto-optic material are connected via a suspension block suspending the magnet over the magneto-optic material, and
means for determining the Faraday rotation of the plane of polarization of the back-reflected polarized light to determine the position of the magnet relative to the sensing end of the optical fiber.

20. A micro-position sensor comprising:
a permanent magnet providing a magnetic field; and
a magneto-optic material positioned in the magnetic field and capable of rotating the plane of polarization of polarized light transmitted through the magneto-optic material,
said magnet being independently movable relative to the magneto-optic material so as to rotate the plane of polarization of the polarized light as a function of the relative position of the magnet, whereby the position of the magnet relative to the magneto-optic material may be determined from the rotated polarized light, and the permanent magnet and the magneto-optic material are connected via a suspension block suspending the magnet over the magneto-optic material.

* * * * *